(12) United States Patent
van Laack et al.

(10) Patent No.: US 10,168,787 B2
(45) Date of Patent: Jan. 1, 2019

(54) METHOD FOR THE TARGET RECOGNITION OF TARGET OBJECTS

(71) Applicants: Alexander van Laack, Aachen (DE); Paul O. Morris, Ann Arbor, MI (US); Oliver Kirsch, Wuppertal (DE)

(72) Inventors: Alexander van Laack, Aachen (DE); Paul O. Morris, Ann Arbor, MI (US); Oliver Kirsch, Wuppertal (DE)

(73) Assignee: VISTEON GLOBAL TECHNOLOGIES, INC., Van Buren Township, MI (US)

( * ) Notice: Subject to any disclaimer, the term of this patent is extended or adjusted under 35 U.S.C. 154(b) by 0 days.

(21) Appl. No.: 15/266,599

(22) Filed: Sep. 15, 2016

(65) Prior Publication Data

US 2017/0147078 A1     May 25, 2017

(30) Foreign Application Priority Data

Sep. 15, 2015   (DE) ................ 10 2015 115 526

(51) Int. Cl.
| | | |
|---|---|---|
| *G06F 3/01* | (2006.01) | |
| *G06K 9/00* | (2006.01) | |
| *G06F 3/0484* | (2013.01) | |

(52) U.S. Cl.
CPC ............. *G06F 3/017* (2013.01); *G06F 3/013* (2013.01); *G06F 3/04842* (2013.01); *G06K 9/00335* (2013.01); *G06F 2203/0381* (2013.01)

(58) Field of Classification Search
CPC ...... G06F 3/013; G06F 3/017; G06K 9/00335
See application file for complete search history.

(56) References Cited

U.S. PATENT DOCUMENTS

| | | | | |
|---|---|---|---|---|
| 8,933,882 B2* | 1/2015 | Burachas | ................ | G06F 3/012 345/157 |
| 2010/0220288 A1* | 9/2010 | Cleveland | .............. | A61B 3/113 351/206 |
| 2012/0229509 A1* | 9/2012 | Liu | ......................... | G06F 3/011 345/633 |
| 2013/0002551 A1 | 1/2013 | Imoto et al. | | |
| 2013/0321270 A1 | 12/2013 | Bjorklund et al. | | |
| 2014/0184494 A1 | 7/2014 | Burachas | | |
| 2014/0191946 A1* | 7/2014 | Cho | ..................... | G02B 27/017 345/156 |
| 2014/0292665 A1 | 10/2014 | Lathrop et al. | | |
| 2015/0054743 A1 | 2/2015 | Orhand et al. | | |

FOREIGN PATENT DOCUMENTS

| | | |
|---|---|---|
| DE | 102015201728 A1 | 8/2016 |
| WO | 2015001547 A1 | 1/2015 |

* cited by examiner

*Primary Examiner* — Afroza Chowdhury
(74) *Attorney, Agent, or Firm* — Dickinson Wright PLLC

(57) ABSTRACT

A method for the target recognition of target objects, in particular for the target recognition of the operating elements in a motor vehicle are disclosed herein. The method (and systems which incorporate the method) may employ various gaze tracking device, hand tracking devices, and combine inputs from the two based on a methodology for correlation.

20 Claims, 4 Drawing Sheets

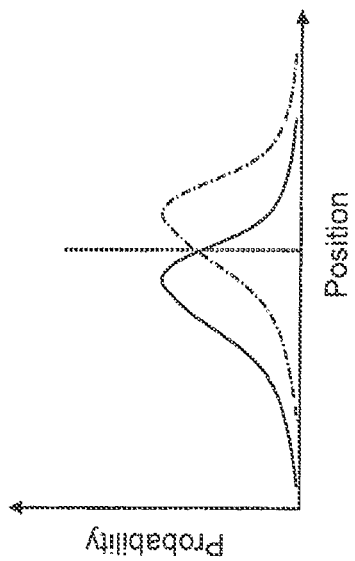
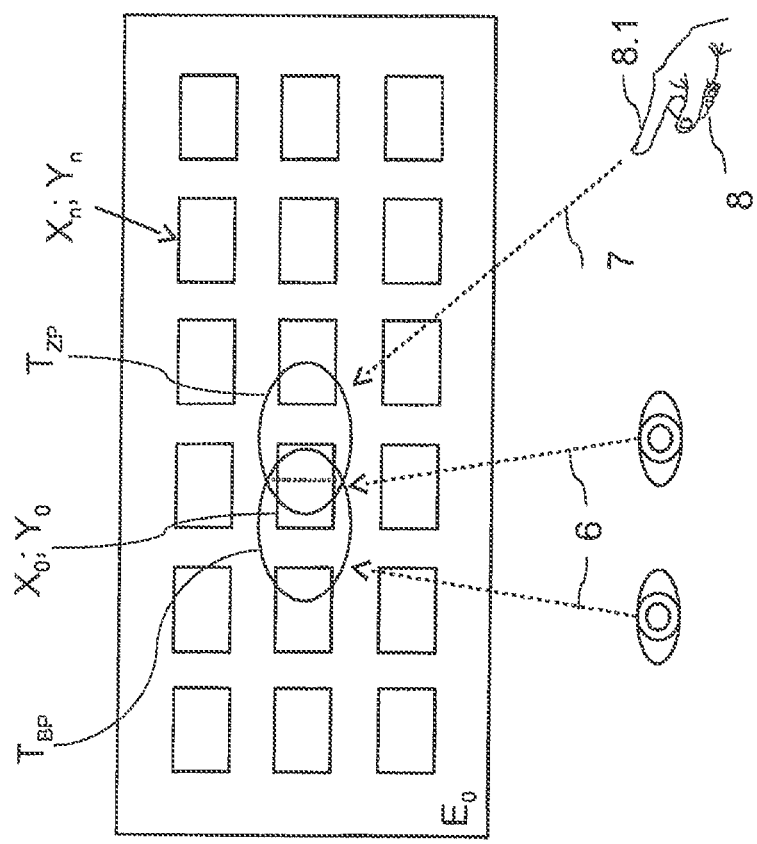
FIGURE 4B
FIGURE 4A

METHOD FOR THE TARGET RECOGNITION OF TARGET OBJECTS

CROSS-REFERENCE TO RELATED APPLICATIONS

This application claims priority to German Patent Application No. 10 2015 115 526.5, filed Sep. 15, 2015 and entitled "Method for the Target Recognition of Target Objects, in Particular for the Target Recognition of Operating Elements in a Vehicle," which is herein incorporated by reference.

BACKGROUND

The disclosure relates to a method for the target recognition of target objects, in particular for the target acquisition of operating elements in a vehicle.

A plurality of systems and methods can be gathered from the prior art which make possible a contactless interaction with virtual elements for users via graphic user surface, also designated in short as GUI for "graphical user interface". Such systems are used in technical areas in which a contamination by a direct contact with operating elements is undesired or in which operating elements lie out of range for a user.

Therefore, a control system for a vehicle is known from US 2014/0292665 A1 in which the control of operating elements is based on a camera-based following of the viewing direction, also designated as "gaze-tracking" or "eye-tracking" and on a camera-based or sensor-based recognition of gestures of the user. In order to control the operating elements, the following of the viewing direction and the control of gestures can be combined with one another, in which a processor unit or software recognizes an operating element fixed visually by the user. As such, an activation of the operating element or a release for further actions/functions of the operating element does not take place until a gesture recognition module recognizes an appropriately associate-able hand movement or finger movement of the user. The target acquisition of operating elements is therefore based substantially on following the view of the user without a geometric relationship to positional data of a performed gesture being required.

An improved target accuracy in the recognition of virtual elements may be achieved with the technical teaching disclosed in WO 2015/001547 A1. It suggests a method for the target recognition of virtual elements, wherein a spatial relationship between the direction of view and the indicating direction of an indicating gesture of the user is taken into consideration. The direction of the indication of a finger of the user is determined with a 3-D image recording device and compared with the viewing direction of the user. In as far as the alignment of the two directional vectors viewing direction and indicating direction takes place within a tolerance range an interaction with a virtual element or the contactless movement of the cursor via a display device can be realized by the user. However, the recognition of the three-dimensional relationship between the viewing direction vector and the directional vector of the indicating gesture requires a relatively high computer performance.

Another technical teaching that takes into account the combination of the viewing direction and the indicating direction as well as their spatial relationship in the recognition of targets of virtual elements is apparent from US 2014/184494 A1. It also suggests a solution for determining intersections of the directional vectors of the viewing direction and of the indicating direction with a representation plane for virtual elements.

The systems known from the prior art have the disadvantage that a successful target recognition of virtual elements must be preceded by an expensive calibration in which several individual objects must be aimed at by the user.

SUMMARY

Disclosed herein is a method for the target recognition of target objects in a simpler manner than taught above, to manage and with which an improved target accuracy can be ensured.

The method for the recognition of targets of target objects, in particular for the recognition of operating elements in a vehicle uses the following procedure in which a directional vector of a viewing direction of a user and a directional vector of an indicating direction of at least one indicating gesture of a finger of the user are recognized and a first intersection of the directional vector of the viewing direction with a first target plane which lies at a certain distance from the user, and a second intersection of the directional vector of the indicating direction with the first target plane are determined, wherein in the case of a common position of the intersections in a tolerance range of a first target object arranged in the first target plane and/or in the case of an at least sectional overlapping of intersection tolerance ranges of the intersections formed in the target plane with the first target object arranged in the first target plane the intersections are associated with the first target object arranged in the first target plane.

At the same time an interval of the first intersection and an interval of the second interval from the coordinates of the target object are recognized. The intervals of the intersection coordinates from the first target object are used to determine interval correction coordinates in the target recognition of the target object or at least of another target object.

The tolerance range of a target object defined in the first target plane already makes possible a rough association of intersection coordinates of recognized and/or calculated directional vectors of the viewing direction and of the indicating direction of a user to a target object aimed at by the user without an initial calibration of the target recognition being necessary. Note here that the term "an association of the intersections with a target object" denotes that a successful target recognition of the target object.

In order to form the tolerance ranges the coordinates of the intersections are multiplied by a correction factor. Large tolerance ranges for the particular intersections can be formed here within the X-Y target plane. Furthermore, suitable correction factors make possible a variation of the flat shape of a tolerance range of an intersection. It is also conceivable that the boundaries of a tolerance range are represented by polar correction coordinates which originate in the particular calculated intersections.

The correction factor for an intersection coordinate of the directional vector of an indicating direction can be a function of the distance of the fingertip from the target plane and/or from the azimuth and the elevation of the finger with which the user indicates the target plane. Likewise, a correction factor for an intersection coordinate of the directional vector of a viewing direction can be a function of the distance of the eyes of the user from the target surface. The correction can be advantageously further improved by taking into account the spatial position of the fingertip and of the spatial position of the user's eyes. Furthermore, it can be provided that associated or recognized correction factors of the particular intersections are continuously stored. A correction factor average value can be formed from the number of stored values of the particular correction factors and can be used to form the intersection tolerance range of an intersection. The formation of average values of correction factors improves the accuracy in the recognition of targets since substantially deviating values are not considered by the average values of correction factors in the formation of intersection tolerance ranges.

Accordingly, all coordinates inside the tolerance range can be associated with the intersection coordinates of the associated intersection. As a consequence, in case of an overlapping of the tolerance ranges of the first and of the second intersection with a target object an association of the intersections with the target object can already be achieved without the intersections directly striking the target object.

The method is furthermore advantageously distinguished in that the precision of the association of the intersection coordinates can be improved in that the determined intervals of the intersection coordinates from the coordinates of the first target object are used for the correction in the target recognition of other target objects. Therefore, in the case of target recognition of other target objects an automatic intersection correction of the first intersection and an intersection correction of the second intersection can take place, wherein the intervals of the intersection coordinates from the target object coordinates determined in the association with the first target object are taken into account. Recognized intervals are added to or subtracted from the actual intersection coordinates as a function of the calculated intersection position. Therefore, it is not decisive which angle of intersection the directional vectors have with the target plane since in order to recognize targets only the position of the intersection coordinates in the two-dimensional target plane is evaluated. Consequently, the target recognition is based on a positional relationship of the intersection coordinates and of the target object coordinates inside the target plane.

According to an advantageous embodiment, the target objects are recognized as flat elements of the target plane. Therefore, the probability of the association can be raised since a plurality of associate-able intersection combinations of the first and of the second intersection are available in the flat area of a target object. In the case of an overlapping of the intersection tolerance areas with flat target objects the magnitude of the intersection surface can be taken into account in the association of target objects. The greater the intersection surface of a tolerance range of an intersection with the surface of a target object is, the greater the probability of association with this target object.

According to another aspect disclosed herein, a target object is associated with a virtual and/or a real operating element. It is immaterial for the recognition of targets whether it is a virtual or a real target object. The target recognition of elements which can be virtually represented takes place, for example, in combination with a display unit, wherein a display or the projection plane of a head-up device represent the target plane. In the target recognition of real operating elements such as, for example, the rotary selection disk of a vehicle air-conditioning unit virtual target planes comprising the target objects concerned are defined by a software. The coordinates are known, permanently constructed operating elements so that the target plane associated for the recognition of targets can be defined in a simple manner. In addition, the association with the pertinent operating element is also facilitated by the knowledge of the coordinates. In vehicles the accuracy in the recognition of targets is favored in that the approximate spatial position of the user and consequently the positions of the input units eyes and hand and finger necessary for the recognition of the viewing direction and the recognition of gestures can be better estimated.

If the intersections detected within a tolerance range of a target object are associated with the target object, the association with the target object can be reported back to the user preferably acoustically, visually and/or tactilely. Therefore, a successful target recognition can be carried out by the user.

According to an, a target recognition for other target objects is activated by the association of the intersections with the first target object. This embodiment of the method is especially advantageous in vehicles since the target recognition cannot be activated until as needed and must not be permanently active. As a result, the danger of an erroneous interpretation of the viewing direction and/or of gestures of the driver, as can be the case with a continuous monitoring of the viewing direction and of gestures, can be kept small. It is advantageous if the first target object is arranged in such a manner or is virtually represented so that it can be aimed at by the user without a barrier without overlappings with other possible target objects occurring. The first target object can also be advantageously characterized by a symbol or an inscription so that the user recognizes the first target object as the on switch for the target recognition. In the same manner the first target object or another target object can be defined as the turn off switch, wherein the target recognition is deactivated upon an association of the first and the second intersection.

A reference surface can advantageously form the origin of the reference coordinate system, wherein this reference surface is located in the viewing range of a 3-D camera. As a result, the reference coordinate system can be automatically measured in. A display surface is advantageously suitable as an X-Y target plane. The origin of the coordinates can then lie in one of the four corners of the X-Y plane.

According to an embodiment, the coordinates of the first target objects can serve as reference point for a spatial coordinate system. In this manner an especially simple association of other target objects can be achieved in the target recognition.

The coordinates of the first target object and of the other target objects are preferably known so that the positional relationships, in particular for real operating elements, can be stored. Certain target objects for a target recognition can advantageously be faded out or deactivated if several target objects perspectively overlap one another or if adjacent target objects have no functional relationship with each other. The error rate in the association can be reduced based on the known positional relationship of target objects and the possibility of fading out or deactivating certain target objects for a target recognition.

According to a further development, the first target plane is used as reference plane for at least one other target plane. This is advantageous if several target planes are located at different distances z from the user. This can be the case, e.g. if a target recognition of real operating elements is combined with virtual target objects represented at a distance on a display. However, it is necessary here that the coordinates of the first target plane are known. A switching between different target planes with different target objects can be achieved, e.g. in that a target plane which is the closest in the viewing direction and the indicating direction and is located in front of, behind or next to the target plane currently being observed is selected as soon as a leaving of the intersections of the two directional vectors of the viewing direction and of the indicating direction over a boundary of the current target plane is registered. Overlapping target planes can be faded out in the selection of a target plane.

Another advantage, the fact that a movement pattern of a first intersection and/or of a second intersection detected on a target plane is associated with an input command without a complex, spatial gesture recognition by hand or finger gestures being required.

BRIEF DESCRIPTION OF THE DRAWINGS

Other details, features and advantages of embodiments, result from the following description of exemplary embodiments with reference made to the associated drawings. In the drawings:

FIG. 4A shows another schematic view for explaining the methods disclosed herein;

FIG. 4B shows a diagram for explaining a variant of an embodiment of the methods disclosed herein.

DETAILED DESCRIPTION

Figure 1:
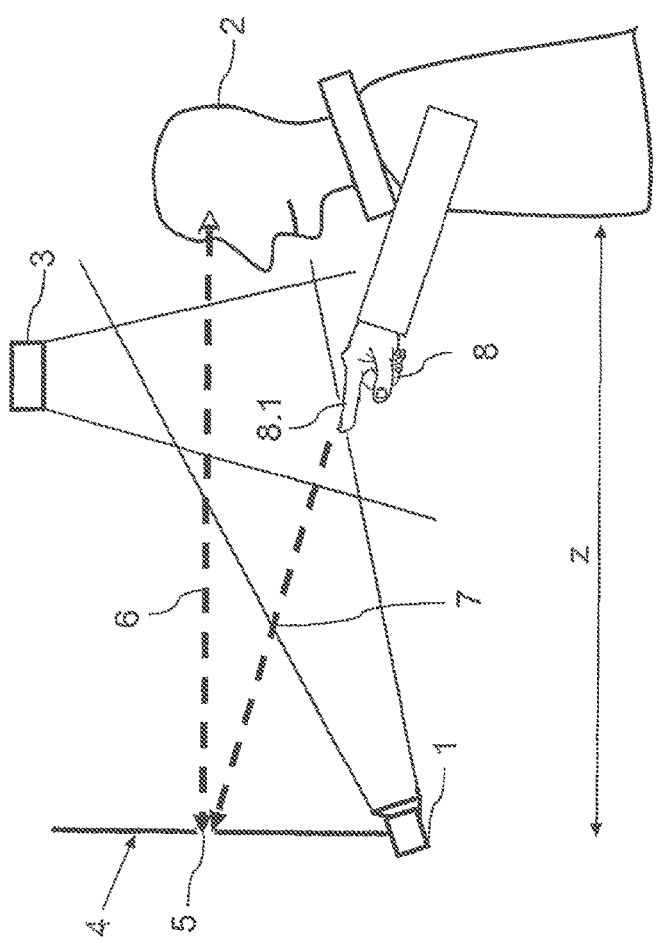
FIG. 1 shows a sketch of a target recognition system known from the prior art.

FIG. 1 shows a system for target recognition in accordance with the prior art. The system comprises a first camera 1 directed onto a user 2 and is connected to an image evaluation unit (not shown here) for recognizing the eye movement of the user 2. Furthermore, the system comprises a second camera 3 which is arranged in such a manner that an image range can be recorded in which the user 2 can make indicating gestures. The second camera 3 is also connected to the image evaluation unit, which is not shown. Images recorded with the cameras 1, 3 are analyzed in the image evaluation unit. The hand 8 of the user 2 recorded in the image range of the second camera 3 is analyzed and the spatial position of the finger 8.1 is determined. Subsequently, a directional vector 7 of the indicating device is determined from the position data X-Y-Z of the finger 8.1. At the same time the image evaluation unit analyzes a viewing direction based on the movement of the pupil of the user 2 and calculates from it a directional vector 6 of the viewing direction of the user 2.

A display unit 4 is provided for representing virtual elements. The display unit 4 is arranged removed at a known distance z from the user 2. A virtual element 5 is shown in the image plane of the display unit 4 which is aimed at by the user 2. A processor unit which is not shown and which can be associated with the image analysis unit calculates the intersection coordinates of the directional vectors 6 and 7 with the two-dimensional display device 4.

Figure 2:
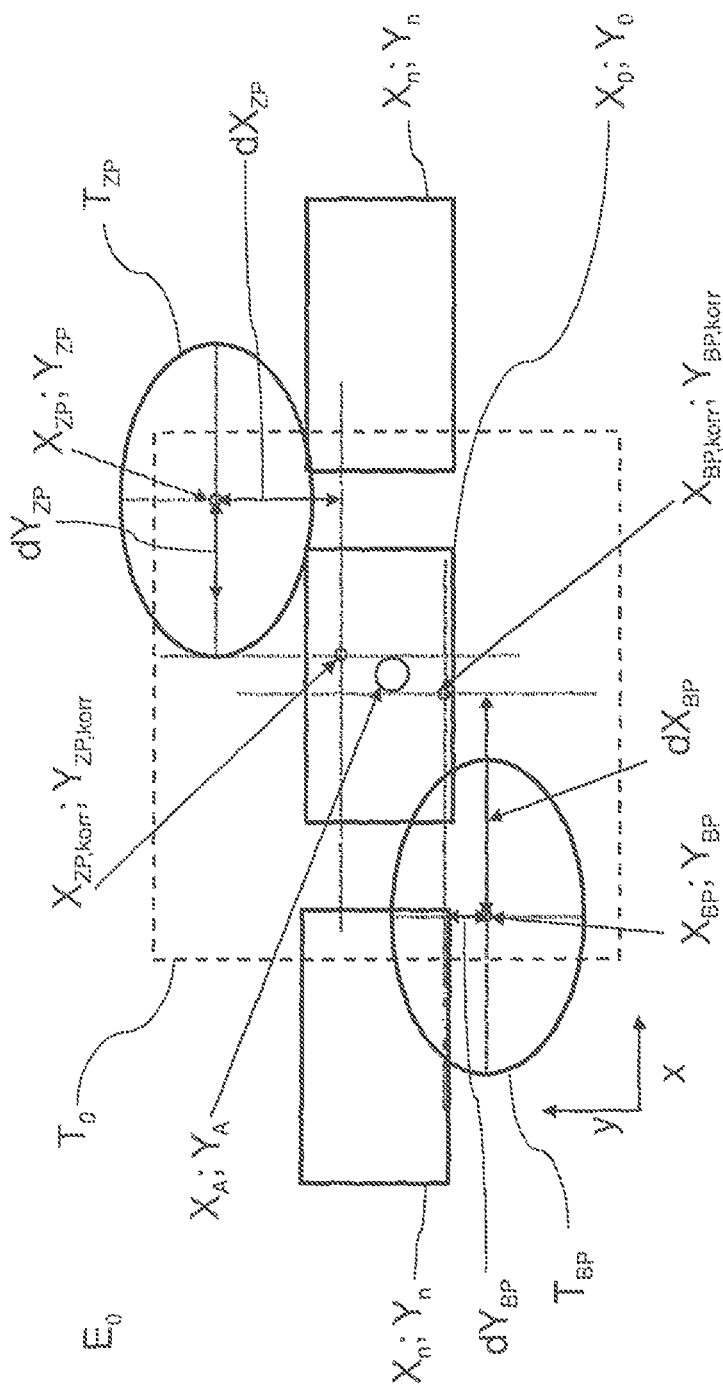
FIG. 2 shows a schematic view for explaining a variant of an embodiment.

FIG. 2 shows a schematic view for explaining the aspects disclosed herein. It shows a section of a target plane $E_0$, wherein it can be a display unit 4, as is shown in FIG. 1, or a projection plane of a head-up device (not shown). Furthermore, a first target object $(X_0; Y_0)$ and other target objects $(X_n; Y_n)$ in the form of flat, rectangular, virtual operating elements are shown. The coordinates of the intersections $(X_{BP}; Y_{BP})$ and $(X_{ZP}; Y_{ZP})$ are illustrated as coordinates of the intersections of the directional vectors 6 and 7 shown in FIG. 1 with the target plane $E_0$ inside the tolerance range $T_0$ of the first target object $(X_0; Y_0)$, which tolerance range is shown in dotted lines.

Flat intersection tolerance ranges $T_{BP}$; $T_{ZP}$ are indicated around the intersections $(X_{BP}; Y_{BP})$ and $(X_{ZP}; Y_{ZP})$, which tolerance ranges are defined by correction factors multiplied by the X and Y coordinates. The intersection tolerance ranges $T_{BP}$; $T_{ZP}$ are a variant of an embodiment of the method which is described in detail in the description for FIG. 3.

In the method for the recognition of targets of target objects a directional vector 6 of the viewing direction of the user 2 and a directional vector 7 of the indicating direction of at least one indicating gesture of a finger 8.1 of the user 2 is recognized and a first intersection $(X_{BP}; Y_{BP})$ of the directional vector 6 of the viewing direction is determined with a first target plane $E_0$ located at a distance z from the user and a second intersection $(X_{ZP}; Y_{ZP})$ of the directional vector 7 of the indicating device is determined with the first target plane $E_0$. If a common position of the intersections $(X_{BP}; Y_{BP})$ and $(X_{ZP}; Y_{ZP})$ is detected in the tolerance range $T_0$ of the first target object $(X_0; Y_0)$, the intersections $(X_{BP}; Y_{BP})$ and $(X_{ZP}; Y_{ZP})$ are associated with the target object $(X_0; Y_0)$. The target recognition of the first target object $(X_0; Y_0)$ is reported back to the user 2 by an acoustic or an optical signal. A report about the target recognition can also be made by a vibration of a guide wheel (not shown). At the same time the intervals $(dX_{BP}; dY_{BP})$ of the first intersection $(X_{BP}; Y_{BP})$ of the coordinates of the first target object $(X_0; Y_0)$ and the intervals $(dX_{ZP}; dY_{ZP})$ of the second intersection $(X_{ZP}; Y_{ZP})$ are recognized by the coordinates of the first target object $(X_0; Y_0)$ and are used to determine intersection correction coordinates $(X_{BP,korr}; Y_{BP,korr})$ and $(X_{ZP,korr}; Y_{ZP,korr})$ in the target recognition of the target object $(X_0; Y_0)$ or in a target recognition of at least one other target object $(X_n; Y_n)$.

In the present case the intersection correction coordinates $(X_{BP,korr}; Y_{BP,korr})$ and $(X_{ZP,korr}; Y_{ZP,korr})$ of the intersections $(X_{BP}; Y_{BP})$ and $(X_{ZP}; Y_{ZP})$ are calculated according to the following general equations:

$$X_{korr} = X + dX \quad (1)$$

$$Y_{korr} = Y + dY \quad (2)$$

According to the method, virtual or real operating elements can be recognized as flat target objects. It is advantageous here that the flat extensions and the associated coordinates are known inside the target plane. This can facilitate the ability to associate with a target object since the flat target area comprises a plurality of intersection coordinate combinations.

In order to achieve a further increase in the accuracy in the association with a target object, target coordinates $(X_A, Y_A)$ of the target object $(X_0; Y_0)$ can be calculated from the calculated intersection correction coordinates $(X_{BP,korr}; Y_{BP,korr})$ and $(X_{ZP,korr}; Y_{ZP,korr})$ according to the following equations.

$$X_A = \tfrac{1}{2}(X_{BP,korr} + X_{ZP,korr}) \quad (3)$$

$$Y_A = \tfrac{1}{2}(Y_{BP,korr} + Y_{ZP,korr}) \quad (4)$$

Figure 3B:
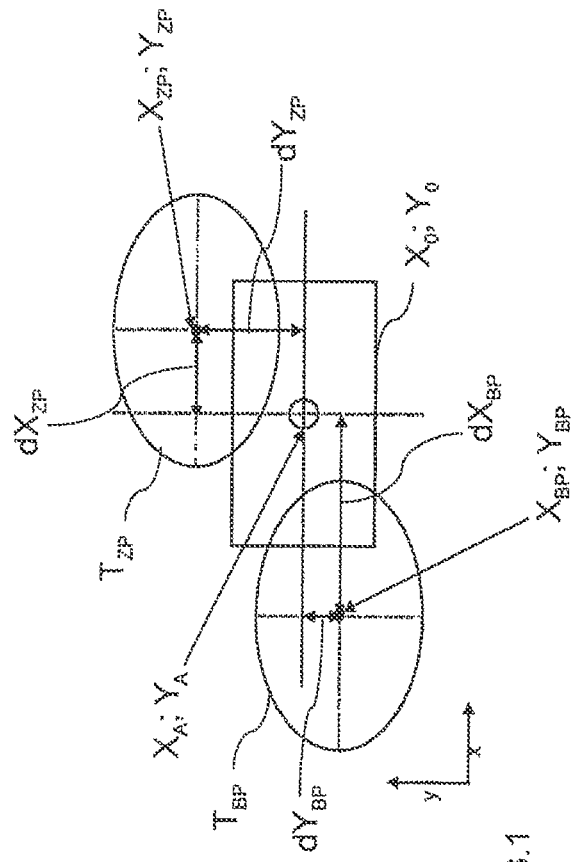
FIGS. 3A and 3B show a schematic view of another variant of an embodiment.
Figure 3A:
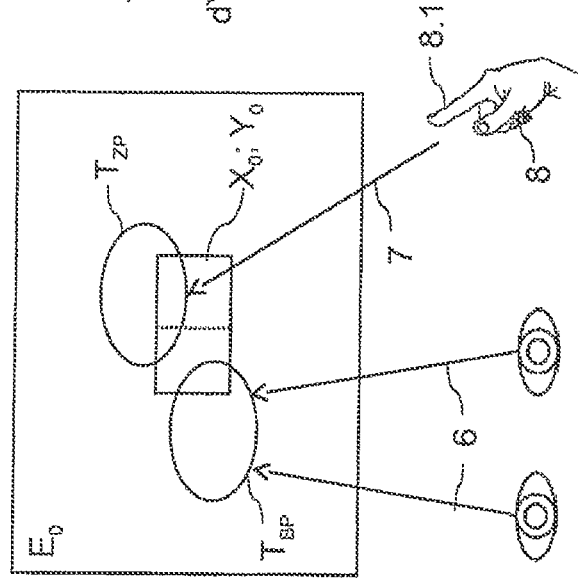

The FIGS. 3a and 3b shows schematic representations of another variation of an embodiment. FIG. 3a shows a schematic top view onto a target plane $E_0$. FIG. 3b shows a section of the target plane $E_0$ from FIG. 3a.

In the embodiment variant shown the X and Y coordinates of the intersections $(X_{BP}; Y_{BP})$ and $(X_{ZP}; Y_{ZP})$ are multiplied by a correction factor $(\alpha, \beta, \gamma, \delta)$ so that for each of the intersections $(X_{BP}; Y_{BP})$ and $(X_{ZP}; Y_{ZP})$ in the target plane $E_0$ a flat, elliptical intersection tolerance range $T_{BP}$, $T_{ZP}$ is defined. In this case an association with a target object ($X_0$; $Y_0$) can take place if the intersection tolerance ranges $T_{BP}$, $T_{ZP}$ simultaneously intersect the flat target object ($X_0$; $Y_0$). A tolerance range $T_0$ of the target object ($X_0$; $Y_0$) is then not obligatorily necessary. The values of the correction factors for each target recognition can be advantageously varied again since the correction factors are a function of the spatial positional data of the finger 8.1 and the spatial positional data of the eyes of the user 2.

Furthermore, the correction factors ($\alpha$, $\beta$, $\gamma$, $\delta$) can be taken into account in the determination of the intersection correction coordinates ($X_{BP,korr}$; $Y_{BP,korr}$) and ($X_{ZP,korr}$; $Y_{ZP,korr}$). The calculation of the intersection correction coordinates ($X_{BP,korr}$; $Y_{BP,korr}$) and ($X_{ZP,korr}$; $Y_{ZP,korr}$) can then take place according to the following general equations:

$$X_{korr}=\alpha X+\alpha dX \text{ or } X_{korr}=\gamma X+\gamma dX \quad (5)$$

$$Y_{korr}=\beta Y+\beta dY \text{ or } Y_{korr}=\delta Y+\delta dY \quad (6)$$

wherein the correction factors can also be varied. A calculation of the target coordinates ($X_A$; $Y_A$) can take place according to the equations (3) and (4).

FIG. 3a shows a schematic top view onto the target plane $E_0$, wherein an individual target object ($X_0$; $Y_0$) is shown. In the case of a representation of an individual target object ($X_0$; $Y_0$), especially in a representation in a viewing angle and/or indicating angle that is unusual for the user 2, there is the possibility of providing the target object ($X_0$; $Y_0$) with a function which brings about an activation and/or a deactivation of the target recognition. In this manner a target recognition for other target objects ($X_n$, $Y_n$) can be activated or deactivated by the association of the intersections ($X_{BP}$; $Y_{BP}$) and ($X_{ZP}$; $Y_{ZP}$) or by the intersection tolerance ranges $T_{BP}$; $T_{ZP}$ with the first target object ($X_0$; $Y_0$).

FIG. 4a shows a top view onto a target plane $E_0$ on which a target object ($X_0$; $Y_0$) and other target objects ($X_n$, $Y_n$) are represented. An association of the directional vector 7 of the indicating direction of the finger 8.1 and of the directional vector 6 of the viewing direction of a user 2 with a rectangular, flatly represented target object ($X_0$; $Y_0$) is shown. According to a variant of an embodiment of the method the association with the target object ($X_0$; $Y_0$) takes place based on a simultaneous intersection of defined, elliptical intersection tolerance ranges $T_{BP}$; $T_{ZP}$ with the target object ($X_0$; $Y_0$). The first target object ($X_0$; $Y_0$), whose surface coordinates and center coordinates are known, can serve here as reference point for a three-dimensional coordinate system (not shown).

It can be provided that a target recognition for selected other target objects ($X_n$, $Y_n$) is activated by an association with the target object ($X_0$; $Y_0$), wherein the spatial relationship between the first target object ($X_0$; $Y_0$) and the selected other target objects ($X_n$, $Y_n$) is known. In this case it is advantageous if the first target object ($X_0$; $Y_0$) serves as reference point for a coordinate system, since a positionally accurate association can be realized in the target recognition based on the known distances and positions of the other selected target objects ($X_n$, $Y_n$). Therefore, starting from a virtual target object, a target recognition of real operating elements, for example, in the central console of a vehicle (not shown) can take place.

FIG. 4b shows a diagram for explaining a variant of an embodiment of the method according to the maximum probability method. A determination is made here based on the calculated intersection coordinates ($X_{BP}$; $Y_{BP}$) and ($X_{ZP}$; $Y_{ZP}$) and according to a parametric estimation method which target object ($X_0$; $Y_0$) or ($X_n$, $Y_n$) represented on the display surface—represented in the diagram with the dotted vertical line—is the most likely one for a target recognition. The probability of association is entered on the Y axis of the diagram. The two curves represent on the one hand the probability of the viewing direction and on the other hand the probability of the indicating gesture and the maximum target probabilities of the intersections ($X_{BP}$; $Y_{BP}$) and ($X_{ZP}$; $Y_{ZP}$) for a target object ($X_0$; $Y_0$) or ($X_n$, $Y_n$) in the target plane. If the determined probability maxima of the intersections ($X_{BP}$; $Y_{BP}$) and ($X_{ZP}$; $Y_{ZP}$) lie in the vicinity of a target object—represented in the diagram by the dotted vertical line—an association with this target object can take place.

What is claimed is:

1. A method for target recognition of target objects, comprising:
    recognizing a directional vector of a viewing direction of a user and of a directional vector of an indicating device for at least one indicating gesture of a finger (8.1) of the user;
    determining a first intersection (XBP; YBP) of the directional vector of the viewing direction with a first target plane (E0) located at a distance (z) from the user, and
    determining a second intersection (XZP; YZP) of the directional vector of the indicating direction with the first target plane (E0),
    wherein in response to the intersections (XBP; YBP) and (XZP; YZP) simultaneously being within a predetermined tolerance range T0 of a first target object (X0; Y0) arranged in the first target plane (E0), the intersections are associated with the first target object arranged in the first target plane, and
    interval tolerance ranges (TBP; TZP) are formed by multiplying the coordinates of the intervals (XBP; YBP) and (XZP; YZP) with a correction factor ($\alpha$, $\beta$, $\gamma$, $\delta$),
    wherein the correction factor ($\alpha$, $\beta$, $\gamma$, $\delta$) is defined by a spatial relationship of the fingertips and the eyes with the first target plane (E0).

2. The method according to claim 1, wherein an association of a target object (X0/n; Y0/n) is reported acoustically, visually and/or tactilely to the user.

3. The method according to claim 1, wherein a target object (X0/n; Y0/n) is recognized as a flat element of the target plane (E0).

4. The method according to claim 1, wherein a target recognition for other target objects (Xn, Yn) is configured to be activated or deactivated by the association of the intersections (XBP; YBP) and (XZP; YZP) with the first target object (X0; Y0).

5. The method according to claim 1, wherein the coordinates of the first target object (X0; Y0) serve as reference point for a spatial coordinate system.

6. The method according to claim 1, wherein the first target plane (E0) serves as reference plane for at least one other target plane (En).

7. The method according to claim 1, wherein a target object is associated with a virtual or real operating element.

8. The method according to claim 1, wherein a movement pattern of a first intersection (XBP; YBP) and of a second intersection (XZP; YZP) detected on a target plane (E0/En) is associated with an input command.

9. A method for target recognition of target objects, comprising:
    recognizing a directional vector of a viewing direction of a user and of a directional vector of an indicating device for at least one indicating gesture of a finger (8.1) of the user;

determining of a first intersection (XBP; YBP) of the directional vector of the viewing direction with a first target plane (E0) located at a distance (z) from the user, and determining of a second intersection (XZP; YZP) of the directional vector of the indicating direction with the first target plane (E0), wherein in response to sectional intersection of intersection tolerance ranges (TBP; TZP) formed in the target plane (E0) and of the intersections (XBP; YBP) and (XZP; YZP), and the sectional intersection tolerance ranges being with a predetermined sized plane containing the first target object (X0; Y0) arranged in the first target plane (E0), and an interval tolerance ranges (TBP; TZP) are formed by multiplying the coordinates of the intervals (XBP; YBP) and (XZP; YZP) with a correction factor ($\alpha$, $\beta$, $\gamma$, $\delta$), wherein the correction factor ($\alpha$, $\beta$, $\gamma$, $\delta$) is defined by a spatial relationship of the fingertips and the eyes with the first target plane (E0).

10. The method according to claim 9, further comprising employing a self-learning algorithm to redefine the correction factor ($\alpha$, $\beta$, $\gamma$, $\delta$) based on an iterative process of using a system in which the method is implemented thereon.

11. The method according to claim 9, wherein the correction factor ($\alpha$, $\beta$, $\gamma$, $\delta$) each correspond to a respective one of the intersection vectors.

12. The method according to claim 1, further comprising:
using the determined intervals of the intersection coordinates from the coordinates of the first target object (X0; Y0) for correction in target recognition of other target objects.

13. An apparatus for target recognition of target objects, comprising:
a processor unit is configured to:
recognize a directional vector of a viewing direction of a user and of a directional vector of an indicating device for at least one indicating gesture of a finger (8.1) of the user;
determine a first intersection (XBP; YBP) of the directional vector of the viewing direction with a first target plane (E0) located at a distance (z) from the user, and determine a second intersection (XZP; YZP) of the directional vector of the indicating direction with the first target plane (E0), wherein in response to the intersections (XBP; YBP) and (XZP; YZP) simultaneously being within a predetermined tolerance range T0 of a first target object (X0; Y0) arranged in the first target plane (E0), the intersections are associated with the first target object arranged in the first target plane, and interval tolerance ranges (TBP; TZP) are formed by multiplying the coordinates of the intervals (XBP; YBP) and (XZP; YZP) with a correction factor ($\alpha$, $\beta$, $\gamma$, $\delta$), wherein the correction factor ($\alpha$, $\beta$, $\gamma$, $\delta$) is defined by a spatial relationship of the fingertips and the eyes with the first target plane (E0).

14. The apparatus according to claim 13, wherein the processor unit is further configured to report an association of a target object (X0/n; Y0/n) acoustically, visually and/or tactilely to the user.

15. The apparatus according to claim 13, wherein a target object (X0/n; Y0/n) is recognized as a flat element of the target plane (E0).

16. The apparatus according to claim 13, wherein a target recognition for other target objects (Xn, Yn) is configured to be activated or deactivated by the association of the intersections (XBP; YBP) and (XZP; YZP) with the first target object (X0; Y0).

17. The apparatus according to claim 13, wherein the coordinates of the first target object (X0; Y0) serve as reference point for a spatial coordinate system.

18. The apparatus according to claim 13, wherein the first target plane (E0) serves as reference plane for at least one other target plane (En).

19. The apparatus according to claim 13, wherein a movement pattern of a first intersection (XBP; YBP) and of a second intersection (XZP; YZP) detected on a target plane (E0/En) is associated with an input command.

20. The apparatus according to claim 13, wherein the processor unit is further configured to use the determined intervals of the intersection coordinates from the coordinates of the first target object (X0; Y0) for correction in target recognition of other target objects.

* * * * *